United States Patent
Li et al.

(10) Patent No.: US 12,284,011 B2
(45) Date of Patent: Apr. 22, 2025

(54) SOLUTION TO BEAM SQUINT FOR WIDEBAND COMMUNICATIONS

(71) Applicant: NOKIA TECHNOLOGIES OY, Espoo (FI)

(72) Inventors: Zhihang Li, Shanghai (CN); Tao Yang, Shanghai (CN); Nuan Song, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 18/551,380

(22) PCT Filed: Mar. 22, 2021

(86) PCT No.: PCT/CN2021/082127
§ 371 (c)(1),
(2) Date: Sep. 19, 2023

(87) PCT Pub. No.: WO2022/198395
PCT Pub. Date: Sep. 29, 2022

(65) Prior Publication Data
US 2024/0195465 A1    Jun. 13, 2024

(51) Int. Cl.
*H04B 7/0456* (2017.01)
*H04B 7/0452* (2017.01)

(52) U.S. Cl.
CPC ......... *H04B 7/0456* (2013.01); *H04B 7/0452* (2013.01)

(58) Field of Classification Search
CPC .. H04B 7/0456; H04B 7/0452; H04B 7/0671; H04B 7/0617
See application file for complete search history.

(56) References Cited

U.S. PATENT DOCUMENTS

| 7,737,892 B2 * | 6/2010 | Richardson | ........... G01S 7/2813 |
| | | | 342/375 |
| 8,942,307 B2 * | 1/2015 | Kim | ........................ H01Q 3/24 |
| | | | 375/267 |

(Continued)

FOREIGN PATENT DOCUMENTS

CN     107534888 A    1/2018

OTHER PUBLICATIONS

International Search Report and Written Opinion for International Application No. PCT/CN2021/082127, mailed on Dec. 22, 2021, 9 pages.

(Continued)

*Primary Examiner* — Vineeta S Panwalkar
(74) *Attorney, Agent, or Firm* — Brake Hughes Bellermann LLP

(57) ABSTRACT

Embodiments of the present disclosure relate to hybrid beamforming. A plurality of time delay elements is used to perform analog beamforming. Each time delay element is configured to apply the same time delay at different frequencies. The plurality of time delay elements is coupled to at least one RF chain to receive signals. Each antenna in an antenna array is configured to be selectively connected to one of the plurality of time delay elements based on a target configuration of a connection between the plurality of time delay elements and the antenna array. In operation, the target configuration is determined based on time delay information concerning the plurality of time delay elements and channel information concerning a physical channel over which the signals are to be transmitted.

17 Claims, 8 Drawing Sheets

(56) References Cited

U.S. PATENT DOCUMENTS

| | | |
|---|---|---|
| 2019/0081693 A1 | 3/2019 | Eitan et al. |
| 2019/0115658 A1 | 4/2019 | Iannotti et al. |
| 2020/0204244 A1 | 6/2020 | Hajimiri et al. |
| 2022/0320727 A1* | 10/2022 | Molla Aghajanzadeh ............... H01Q 3/2694 |

OTHER PUBLICATIONS

Kim et al.; "Hybrid Beamforming Architecture and Wide Bandwidth True-Time Delay for Future High Speed Communications 5G and Beyond 5G Beamforming System"; 2018 IEEE 3rd International Conference on Integrated Circuits and Microsystems (ICICM); Shanghai, China; Nov. 24-26, 2018; pp. 331-335.

European Search Report for European Patent Application No. 21932029.8, mailed on Nov. 22, 2024, 10 pages.

Office Action for India Patent Application No. 202347063838, mailed on Nov. 27, 2024, 8 pages.

Liu et al.; "Hybrid Beamforming for mmWave MIMO-OFDM System with Beam Squint"; 2018 IEEE 29th Annual International Symposium on Personal, Indoor, and Mobile Radio Communications (PIMRC); Bologna, Italy; Sep. 9-12, 2018; pp. 1422-1426.

\* cited by examiner

SOLUTION TO BEAM SQUINT FOR WIDEBAND COMMUNICATIONS

CROSS-REFERENCE TO RELATED APPLICATIONS

This application is a national stage entry of International Application No. PCT/CN2021/082127, filed Mar. 22, 2021, entitled "SOLUTION TO BEAM SQUINT FOR WIDEBAND COMMUNICATIONS" which is hereby incorporated by reference in its entirety.

FIELD

Embodiments of the present disclosure generally relate to the field of telecommunication and in particular, to a device, apparatus, method, and computer readable storage media for hybrid beamforming.

BACKGROUND

In order to meet the rapid growth of wireless data rates for sixth-generation (6G) systems, the Terahertz (THz) band with an ultra-broad bandwidth has drawn much attention. However, the unprecedented multi-GHz bandwidth in the THz band comes with a cost of huge propagation loss, which drastically limits the communication distance for THz communications. Fortunately, the sub-millimeter wavelength allows an antenna array consisting of 512 and even 1024 antennas at transceivers, to enable THz ultra-massive Multi-Input Multi-Output (UM-MIMO) systems. This can provide a high beamforming gain to compensate the path loss and solve the distance problem. Meanwhile, multiple data streams can be supported to offer a multiplexing gain and further improve the spectral efficiency of the THz systems.

In the THz band, many hardware constraints preclude from using conventional digital beamforming, which, instead, motivates the use of hybrid beamforming. The hybrid beamforming divides the signal processing into the digital baseband domain and analog radio frequency (RF) domain, which can achieve high spectral efficiency while maintaining low hardware complexity. For wideband communications with multiple carriers, a beam squint effect where beams of some carriers are misaligned may be caused. When the beam squint effect is very severe, this effect is also known as "beam split". The beam squint effect can cause tens of dB gain loss in THz wideband communication systems and thus need to be addressed.

SUMMARY

In general, example embodiments of the present disclosure provide a solution for hybrid beamforming.

In a first aspect, there is provided an apparatus. The apparatus comprises at least one processor; and at least one memory including computer program codes; the at least one memory and the computer program codes are configured to, with the at least one processor, cause the apparatus to obtain time delay information concerning a plurality of time delay elements, a time delay element of the plurality of time delay elements configured to apply a same time delay at a plurality of frequencies; determine target precoding information for the plurality of frequencies based on channel information concerning a physical channel, signals at the plurality of frequencies are to be transmitted over the physical channel; determine a target configuration of a connection between the plurality of time delay elements and an antenna array based on the time delay information and the target precoding information, the target configuration indicating a time delay element to which an antenna in the antenna array is to be connected.

In a second aspect, there is provided a device. The device comprises a plurality of time delay elements coupled to at least one radio frequency chain, a time delay element of the plurality of time delay elements being configured to apply a same time delay to signals at a plurality of frequencies received from the at least one radio frequency chain; and the antenna array, an antenna in the antenna array being configured to be selectively connected to a time delay element of the plurality of time delay elements based on the target configuration of a connection between the plurality of time delay elements and the antenna array.

In a third aspect, there is provided a method. The method comprises obtaining time delay information concerning a plurality of time delay elements, a time delay element of the plurality of time delay elements configured to apply a same time delay at a plurality of frequencies; determining target precoding information for the plurality of frequencies based on channel information concerning a physical channel, signals at the plurality of frequencies are to be transmitted over the physical channel; determining a target configuration of a connection between the plurality of time delay elements and an antenna array based on the time delay information and the target precoding information, the target configuration indicating a time delay element to which an antenna in the antenna array is to be connected.

In a fourth aspect, there is provided an apparatus comprising means for obtaining time delay information concerning a plurality of time delay elements, a time delay element of the plurality of time delay elements configured to apply a same time delay at a plurality of frequencies; means for determining target precoding information for the plurality of frequencies based on channel information concerning a physical channel, signals at the plurality of frequencies are to be transmitted over the physical channel; means for determining a target configuration of a connection between the plurality of time delay elements and an antenna array based on the time delay information and the target precoding information, the target configuration indicating a time delay element to which an antenna in the antenna array is to be connected.

In a fifth aspect, there is provided a non-transitory computer readable medium comprising program instructions for causing an apparatus to perform at least the method according to the above third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
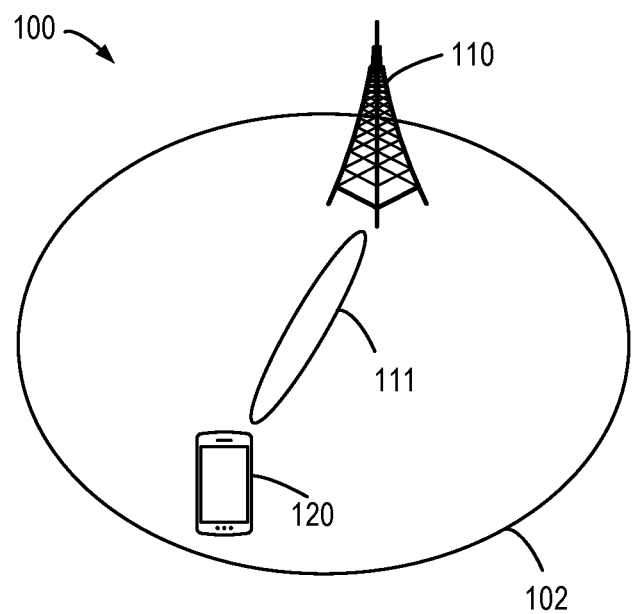
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Example Environment and Working Principle

FIG. 1 shows an example communication network 100 in which embodiments of the present disclosure can be implemented. The network 100 includes a network device 110 and a terminal device 120 served by the network device 110. The network 100 may provide a serving cell 102 to serve the terminal device 120. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In example embodiments, the network device 110 is configured to implement beamforming technique and transmit signals to the terminal device 120 via one or more beams. The terminal device 120 is configured to receive the signals transmitted by the network device 110 via the one or more beams. As shown in FIG. 1, a DL beam 111 is configured for the serving cell 102. It is to be understood that the serving cell 102 may have more beams associated therewith. Alternatively, or in addition, in some example embodiments, the terminal device 120 may be configured to implement beamforming technique and transmit signals to the network device 110 via one or more beams. In the following description, the terms "beamforming" and "precoding" may be used interchangeably.

As mentioned above, the hybrid beamforming is preferred for the THz communications. In most of the existing hybrid beamforming solutions, phase shifters are used to generate beamforming weights for different frequencies. One of the major properties of a phase shifter is frequency-flat. That is, the phase shifter adjusts the same phase for all frequencies in its working band. However, for wideband communication systems with multiple carriers, the beamforming weights required for different carrier frequencies are proportional to the respective carrier frequencies, i.e., frequency-proportional. As a result, the beams of some carriers are misaligned. In other words, the beam squint effect occurs.

In the following, generation of one beam in a Uniform Linear Array (ULA) with N antenna elements is illustrated as an example to analyze the beam squint effect. The cases for multiple beams and other configurations such as a Uniform Planar Array (UPA) are similar and extensible. The target direction of the beam is denoted as $\phi_0$. The array response vector for the angle $\phi_0$ at a frequency $f_m$ can be expressed as:

$$a_{ULA}[f_m, \phi_0] = \left[1, e^{j\frac{2\pi f_m}{c}d\cos(\phi_0)}, \ldots, e^{j\frac{2\pi f_m}{c}d(N-1)\cos(\phi_0)}\right]^T \quad (1)$$

where d is the spacing of antennas in the ULA and c is the speed of light. As can be seen from the equation (1), the array response vector is different for different frequencies $f_m$.

As mentioned above, the phase shifters adjust the same phase for all frequencies. To steer a beam to the target angle $\phi_0$, the beam steering vector composed by the beamforming weights of the phase shifters is usually designed for the central frequency $f_c$ as:

$$w_{ULA} = \left[1, e^{j\frac{2\pi f_c}{c}d\cos(\phi_0)}, \ldots, e^{j\frac{2\pi f_c}{c}d(N-1)\cos(\phi_0)}\right]^T \quad (2)$$

Using the beam steering vector, the beam of the central frequency $f_c$ can be steered to the target angle $\phi_0$. For beams of the other frequencies $f_m \neq f_c$, the actual beam direction $\tilde{\phi}_0$ is expressed as follow:

$$\tilde{\phi}_0 = \arccos\left(\frac{f_c}{f_m}\cos(\phi_0)\right). \quad (3)$$

Compared with the array response, the spatial direction of the beam steering vector is $$\frac{f_c \cos(\phi_0)}{f_m},$$

which reveals that the actual beam direction for the frequency $f_m$ is misaligned to $\tilde{\phi}_0$ as expressed by the equation (3), which is the so-called beam squint effect.

The array gain of the frequency $f_m$ is expressed as:

$$G[f_m, \phi_0] = \tag{4}$$

$$\frac{1}{N}\left|w_{ULA}^H \cdot a_{ULA}[f_m, \phi_0]\right| = \frac{1}{N}\left|\frac{1-e^{j2\pi dN\Psi}}{1-e^{j2\pi d\Psi}}\right| = \frac{1}{N}\left|\frac{\sin(\pi dN\Psi)}{\sin(\pi d\Psi)}\right|.$$

Compared to the maximum array gain achieved at the central frequency $f_c$, the array gain loss in dB at the frequency $f_m$ is expressed as:

$$L_{ULA} = -10\log\left(\frac{1}{N}\left|\frac{\sin\left(\pi dN\frac{(f_m - f_c)\cos(\phi_0)}{c}\right)}{\sin\left(\pi d\frac{(f_m - f_c)\cos(\phi_0)}{c}\right)}\right|\right). \tag{5}$$

As an example, for a THz wideband communication system comprising a ULA with 1024 antennas, the central frequency $f_c$ may be 300 GHz and the bandwidth may be 30 GHz. In this case, the average array gain loss among all carriers is 16.25 dB.

The array gain loss caused by the beam squint effect is prohibitively high and reduces the system performance significantly. Therefore, the beam squint problem needs to be addressed.

There have been some conventional solutions of hybrid beamforming of a wideband to overcome the beam squint problem brought by the phase shifters. In a conventional solution, an effective alternating minimization (AltMin) algorithm is used to optimize the beamforming weights by jointly considering all carriers for a fully-connected (FC) hybrid beamforming architecture. In another conventional solution, a beam squint compensation (BSC) algorithm is proposed for hybrid precoding to compensate an error of the beamforming weights for multiple carriers. In a further conventional solution, wideband hybrid beamforming algorithms which utilize the sum channel covariance matrix of all carriers are proposed for an array-of-subarrays (AoSA) architecture.

For the microwave and mm Wave communication systems where the bandwidth is relatively small, e.g., typically less than 2 GHz, the beam squint problem is insignificant. The above algorithms can compensate most performance loss of the beam squint effect in such microwave and mmWave communication systems. However, for THz communications with ultra-broad bandwidth, e.g., 30 GHz bandwidth at 300 GHz, the frequency deviations among carriers are huge. The beam squint problem caused by the phase shifters is very severe and can hardly be compensated by the above algorithms. Therefore, except for the wideband beamforming algorithm, a novel hardware design is urgently needed and motivated.

There have been some studies which directly substitute all the phase shifters in the hybrid beamforming architectures by adjustable true time delays (TTDs) to solve the beam squint problem for the microwave and mmWave communication systems. These solutions are feasible for the microwave and mmWave communication systems, since the hardware challenges on adjustable TTDs is relatively low. However, for THz UM-MIMO communication systems, on one hand, the ultra-high frequency enhances the hardware complexity of the adjustable TTDs. On the other hand, the number of phase shifters in the THz UM-MIMO systems is usually huge, e.g., 1024. As a result, the required number of the adjustable TTDs is pretty large. Given these two aspects, directly substituting the phase shifters by the TTDs is impractical.

To solve the beam squint problem for THz communications, a delay-phase precoding (DPP) architecture is proposed. In the DPP architecture, a TTD network is inserted between the phase shifters and antennas. Although the DPP architecture can address the beam squint problem for THz communications to a certain degree, the DPP architecture also assumes that the TTDs are adjustable and has an infinite resolution. As such, the DPP architecture is impractical and brings high hardware complexity.

Embodiments of the present disclosure provide a solution for hybrid beamforming. In this solution, instead of the phase shifters, a plurality of time delay elements is used to perform analog beamforming. Each time delay element is configured to apply the same time delay at different frequencies. Specifically, a communication device comprises the plurality of time delay elements and an antenna array. The plurality of time delay elements is coupled to at least one RF chain to receive signals. Each antenna in the antenna array is configured to be selectively connected to one of the plurality of time delay elements.

In operation, a configuration of a connection between the plurality of time delay elements and the antenna array is determined based on time delay information concerning the plurality of time delay elements and channel information concerning a physical channel over which the signals are to be transmitted. The determined configuration indicates a time delay element to which each antenna in the antenna array is to be connected. Each antenna is connected to a respective time delay element based on the determined configuration.

According to the example embodiments of the present disclosure, phases of the signals are adjusted by the time delay elements through tuning the time delays. By applying the same delay at different frequencies, i.e., to different carriers, frequency-proportional phases can be realized. Moreover, through the dynamic connection between the antenna array and the time delay elements, the amount of the time delays applied to the signals can be dynamically tuned. In this way, the beam squint problem can be effectively alleviated and even avoided with low hardware complexity.

It is to be understood that although the beam squint problem is described with respect to the THz communications, embodiments of the present disclosure are not limited in this regard. Rather, the embodiments of the present disclosure are applicable for communications with another bandwidth, for example, the microwave and mmWave communication.

Example Architecture

Figure 2:
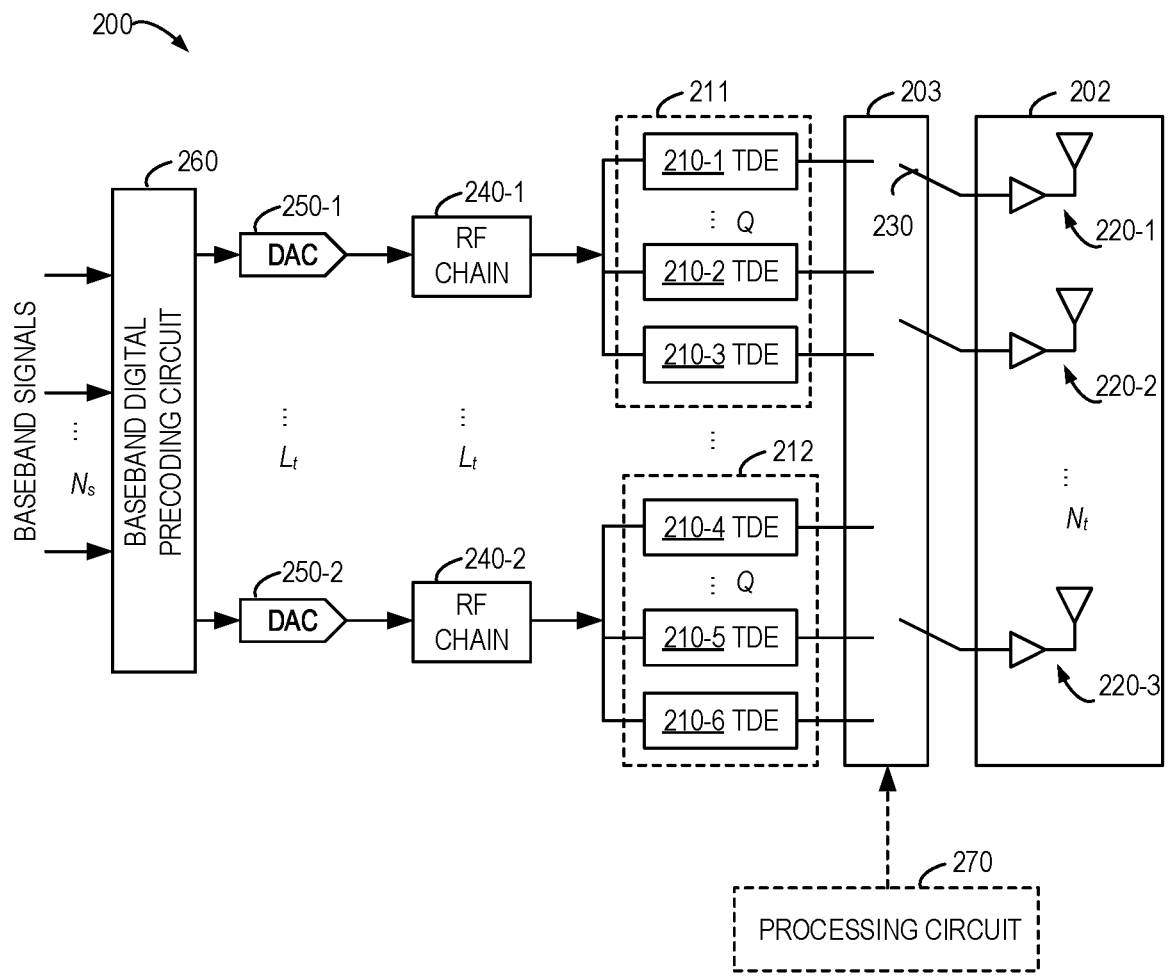
FIG. 2 is a schematic diagram of a communication device according some example embodiments of the present disclosure.

Reference is made to FIG. 2. FIG. 2 illustrates a schematic diagram of an example device 200 according to some embodiments of the present disclosure. In some example embodiments, the device 200 may be implemented as the network device 110 or a part of the network device 110. Alternatively, or in addition, the device 200 may be implemented as the terminal device 120 or a part of the terminal device 120.

A baseband digital precoding circuit 260 is configured to perform digital beamforming on baseband signals. As shown in FIG. 2, $N_s$ baseband signals are input into the baseband digital precoding circuit 260 to generate $L_t$ signals. The output of the baseband digital precoding circuit 260 is coupled to a plurality of digital-to-analog converters (DACs)

250-1, 250-2, etc., which may be collectively referred to as "DACs 250" or individually referred to as "DAC 250". Each DAC 250 receives a respective signal of the $L_t$ signals. The DACs 250 are coupled to a plurality of RF chains 240-1, 240-2, etc., which may be collectively referred to as "RF chains 240" or individually referred to as "RF chain 240". Specifically, each DAC 250 is coupled to a respective RF chain 240. Through the $L_t$ DACs and $L_t$ RF chains, the baseband digital signals are transformed into $L_t$ analog RF signals. Although FIG. 2 shows multiple DACs and RF chains, it is merely for the purpose of illustration without any limitation to the protection scope. In some example embodiments, the device 200 may comprise one DAC and one RF chain.

As shown in FIG. 2, the RF chains 240 are coupled to a plurality of time delay elements (TDEs) 210-1, 210-2, 210-3, 210-4, 210-5, 210-6, etc., which may be collectively referred to as "TDEs 210" or individually referred to as "TDE 210". A TDE 210 is configured to apply the same time delay at different frequencies. In other words, the TDE 210 may apply the same time delay to multiple carriers. As a result, the phase of a RF signal passing through the TDE 210 is adjusted by means of the time delay applied by the TDE 210.

In some example embodiments, the TDEs 210 may be divided into a plurality of groups, a group of which is also referred to as "TDE group". As an example, FIG. 2 shows the TDE groups 211 and 212. In such example embodiments, each TDE group is coupled to a RF chain 240 and the number of TDE groups is the same as the number of the RF chains 240. That is, the TDEs 210 are divided into $L_t$ TDE groups. Each TDE group has the same number of TDEs, which is denoted as Q. As a result, the device 200 comprises TDEs. Alternatively, in some other example embodiments, the TDEs 210 may not be grouped.

The TDE 210 may be implemented by any suitable means. As an example, the TDE 210 may be implemented by true time delay (TTD). The TTD can be realized by a transmission line or a waveguide, which is a common element in a circuit and has a very low hardware complexity. The applied time delay may equal to the length of the transmission line or the waveguide over the speed of light in the material from which the transmission line or the waveguide is made.

In embodiments of the present disclosure, the time delay applied by the TDE 210 may be fixed during operation of the device 200. This means that the time delay is fixed when the $N_s$ baseband signals are being processed. In some example embodiments, the time delay may be adjusted semi-dynamically. This means that the time delay can be adjusted after the device 200 has operated for a time period.

Continuing with FIG. 2, the device 200 further comprises an antenna array 202. The antenna array 202 comprises a plurality of antennas 220-1, 220-2, 220-3, etc., which may be collectively referred to as "antennas 220" or individually referred to as "antenna 220". The number of antennas 220 is denoted as $N_t$. Each antenna 220 is configured to be selectively connected to a TDE 210. Specifically, each antenna 220 is connected to a respective TDE 210 based on a target configuration of a connection between the plurality of TDEs 210 and the antenna array 202. The target configuration indicates which TDE 210 each antenna 220 is to be connected to. In example embodiments, a specific antenna 220 is connected to only one specific TDE 210. More than one antenna 220 may be connected to the same TDE 210. In the following, the configuration of the connection between the plurality of TDEs 210 and the antenna array 202 is also referred to as a "connection configuration".

To connect the antenna 220 to a respective TDE 210, a switching circuit 203 is coupled between the TDEs 210 and the antenna array 202. The switching circuit 203 is configured to connect the antenna 220 to a TDE 210 based on the target configuration.

The switching circuit 203 may be implemented by any suitable manner. For example, as shown in FIG. 2, the switching circuit 203 may be implemented by a switch network comprising $N_t$ switches. Each of the $N_t$ switches is coupled to an antenna 220 and connects the antenna 220 to the TDE 210 as indicated by the target configuration. As another example, the switching circuit 203 may be implemented by a plurality of multiplexers. The protection scope of the present disclosure is not limited with regard to implementation of the switching circuit 203.

In some example embodiments, the device 200 may comprise a processing circuit 270. The processing circuit 270 is configured to determine the target configuration of the connection between the TDEs 210 and the antenna array 202. The processing circuit 270 may be a processing unit or a controller of the device 200. Determination of the target configuration is described below with reference to FIG. 3.

Upon determining the target configuration, the processing circuit 270 may control the switching circuit 203 to connect each antenna 230 to the indicated TDE 210 based on the target configuration. For example, a command may be generated based on the target configuration and transmitted to the switching circuit 203. Upon receiving the command, the switching circuit 203 may connect each antenna 220 to a respective TDE 210. For example, the antenna 220-1 is connected to the TDE 210-1 via the switch 230.

In this way, one or more TDEs 210 are connected to the antenna array 202. It is assumed that $N_a$ TDEs 210 are connected to the antenna array 202. Then, the $L_t$ RF signals received from the $L_t$ RF chains 240 are divided into $N_a$ RF signals by using $N_a$ power dividers. Through $N_a$ TDEs 210, the phases of the $N_a$ RF signals are adjusted by means of the time delays. Through the switching circuit 203, each antenna 220 receives the proper RF signals. Therefore, the TDEs 210 along with the switching circuit 203 are used to perform analog beamforming on the RF signals. In the antenna array 202, the RF signals are amplified by $N_t$ power amplifiers and then transmitted to a receiving device.

An example architecture for hybrid beamforming is described with reference to FIG. 2. In operation, a subset or a subarray of the TDEs is connected to the antenna array, and a specific TDE applies a fixed time delay to multiple carriers. Accordingly, the example architecture is a dynamical-subarray fixed time delay (DS-TD) architecture.

It is to be understood that the circuits, elements and the number thereof as shown in FIG. 2 are for the purpose of illustration without any limitation to the protection scope. Some of the circuits and elements may be omitted in some example embodiments. For example, in some example embodiments, the device 200 may not comprise the switching circuit 203. Instead, the above functionalities described with respect to the switching circuit 203 may be incorporated into the antenna array 202. Accordingly, the hardware complexity can be reduced.

Example Algorithm

As mentioned above, the target configuration of the connection between the TDEs 210 and the antenna array 202 is determined by the processing circuit 270. To this end, channel information concerning a physical channel over which the $N_t$ signals are to be transmitted is needed. The channel information describes a channel state of the physical channel between a transmitting device (which is the device 200) and the receiving device.

The physical channel may be a channel between one or more transmitting antennas of the transmitting device and one or more antennas of the receiving device. The channel information may be represented by a channel matrix, the dimension of which is determined based on the number of transmitting antennas and the number of receiving antennas.

If the number of receiving antennas is denoted as $N_r$, the $N_r \times 1$-dimensional signal y[m] received at the receiving antennas is expressed as:

$$y[m]=H[m]SF[m]D[m]s[m]+n[m] \quad (6)$$

where m=1, 2, . . . , M denotes an index of each of the carriers and M is the number of the carriers of the communication system. s[m] denotes the $N_s \times 1$-dimensional transmitted signals, which are the baseband signals input to the baseband digital preceding circuit 260. D[m] is a $L_t \times N_s$-dimensional digital precoding matrix, which represents digital precoding information for the multiple carriers. F[m] is a $L_t Q \times L_t$-dimensional matrix, which represents time delay information concerning the plurality of TDEs 210. S is a $N_r \times L_t Q$-dimensional matrix, which represents the connection configuration between the TDEs 210 and the antenna array 202 and is also referred to as a "configuration matrix". A row of the matrix S corresponds to an antenna 220 in the antenna array 202 and a column of the matrix S corresponds to a TDE 210. n[m] denotes a $N_r \times 1$-dimensional noise signal. H[m] is $N_r \times N_t$-dimensional channel matrix, which represents the channel information. The channel matrix H[m] can be expressed as:

$$H[m]=\Sigma_{n=1}^{N_p}\alpha_n[m]a_{rn}[m]a_{tn}[m]^H \quad (7)$$

where $N_p$ denotes the number of multipath. $a_{rn}[m]$ and $a_{tn}[m]$ are the array response vectors at the receiving device and transmitting device.

For the purpose of illustration, the formula of $a_{tn}[m]$ is given below as an example and the formula of $a_{rn}[m]$ is similar. For an ULA with N antennas, $a_{tn}[m]$ may be expressed as:

$$a_{tn}[m] = \left[1, e^{j\frac{2\pi f_m}{c}d\cos(\phi_n)}, \ldots, e^{j\frac{2\pi f_m}{c}d(N-1)\cos(\phi_n)}\right]^T \quad (8)$$

where $\phi_n$ refers to the departure angle of the n-th propagation path. $\alpha_n[m]$ is the complex path gain of the n-th propagation path. The generation of angles of multiple propagation paths as well as the path gain $\alpha_n[m]$ is known in the art and thus is not repeated herein. As such, the channel matrix H[m], which is a representation of the channel information, can be determined by using the equations (7), (8) and a similar equation for $a_{rn}[m]$.

A successive-row-decomposition (SRD) algorithm may be used to generate the beamforming weights for DS-TD architecture. The optimization objective is to maximize the spectrum efficiency expressed as:

$$SE = \frac{1}{M}\sum_{m=1}^{M}\log_2\left(\left|I_{N_r} + \frac{1}{\sigma_n^2}H[m]SF[m]D[m](H[m]SF[m]D[m])^H\right|\right) \quad (9)$$

where $\sigma_n^2$ denotes the noise power, which is the same for all carriers. The channel matrix H[m] can be calculated as described above. The configuration matrix S and the digital precoding matrix D[m] are variables to be determined. To this end, the TD matrix F[m], which represents the time delay information of the TDEs 210 is first obtained. The TD matrix F[m] is a quantitative representation of the plurality of TDEs 210.

In the example embodiments where the TDEs 210 are divided into a plurality of groups as shown in FIG. 2, the TD matrix F[m] can be expressed as:

$$F[m]=\text{diag}(f_1[m], f_2[m], \ldots, f_{L_t}[m]) \quad (10)$$

where $f_1[m], f_2[m], \ldots, f_{L_t}[m]$ represents the $L_t$ TDE groups, and diag( ) represents the block diagonal operator. As can be seen from the equation (10), in such example embodiments, the TDEs can be represented in a relative simple manner. In this way, calculation complexity for determining the target configuration is reduced, which enables the DS-TD architecture more practical.

To further simply the DS-TD architecture and the calculation of the target configuration, the $L_t$ TDE groups may be the same in terms of time delay. Accordingly, the TD matrix F[m] can be expressed as:

$$F[m]=\text{diag}(f[m], f[m], \ldots, f[m]) \quad (11)$$

where f[m] represents each TDE group and the number of f[m] in diag( ) is $L_t$. f[m] can be expressed as:

$$f[m]=[e^{j2\pi f_m \tau_1}, e^{j2\pi f_m \tau_2}, \ldots, e^{j2\pi f_m \tau_Q}]^T \quad (12)$$

where $$\tau_i = \tau_{min} + \frac{\tau_{max} - \tau_{min}}{Q-1}(i-1)$$

represents the i-th TDE in each TDE group, $\tau_{max}$ represents a maximum time delay, and $\tau_{min}$ represents a minimum time delay. As an example without any limitation, $$\tau_{max} = \frac{300}{f_c}$$

and $\tau_{min}=0$. $f_c$ is the central frequency. It is to be understood that the expression of $\tau_i$ is given as an example for the purpose of illustration without any limitation to the protection scope. Moreover, the values of $\tau_{max}$ and $\tau_{min}$ can be changed to adjust the performance of the DS-TD architecture.

Second, target precoding information is determined based on the channel information. The target precoding information can be represented by a target precoding matrix P[m]. For example, the target precoding matrix P[m] may be the optimal precoding matrix of the digital precoding of the device 200.

The target precoding matrix P[m] can be calculated as:

$$P[m] = \frac{1}{\sqrt{M}}V_{N_s}[m] \quad (13)$$

where $V_{N_s}[m]$ is the first $N_s$ columns of V[m]. V[m] is calculated by the singular value decomposition of H[m] according to the following equation:

$$H[m]=U[m]\Sigma[m]V[m]^H \quad (14).$$

Figure 3:
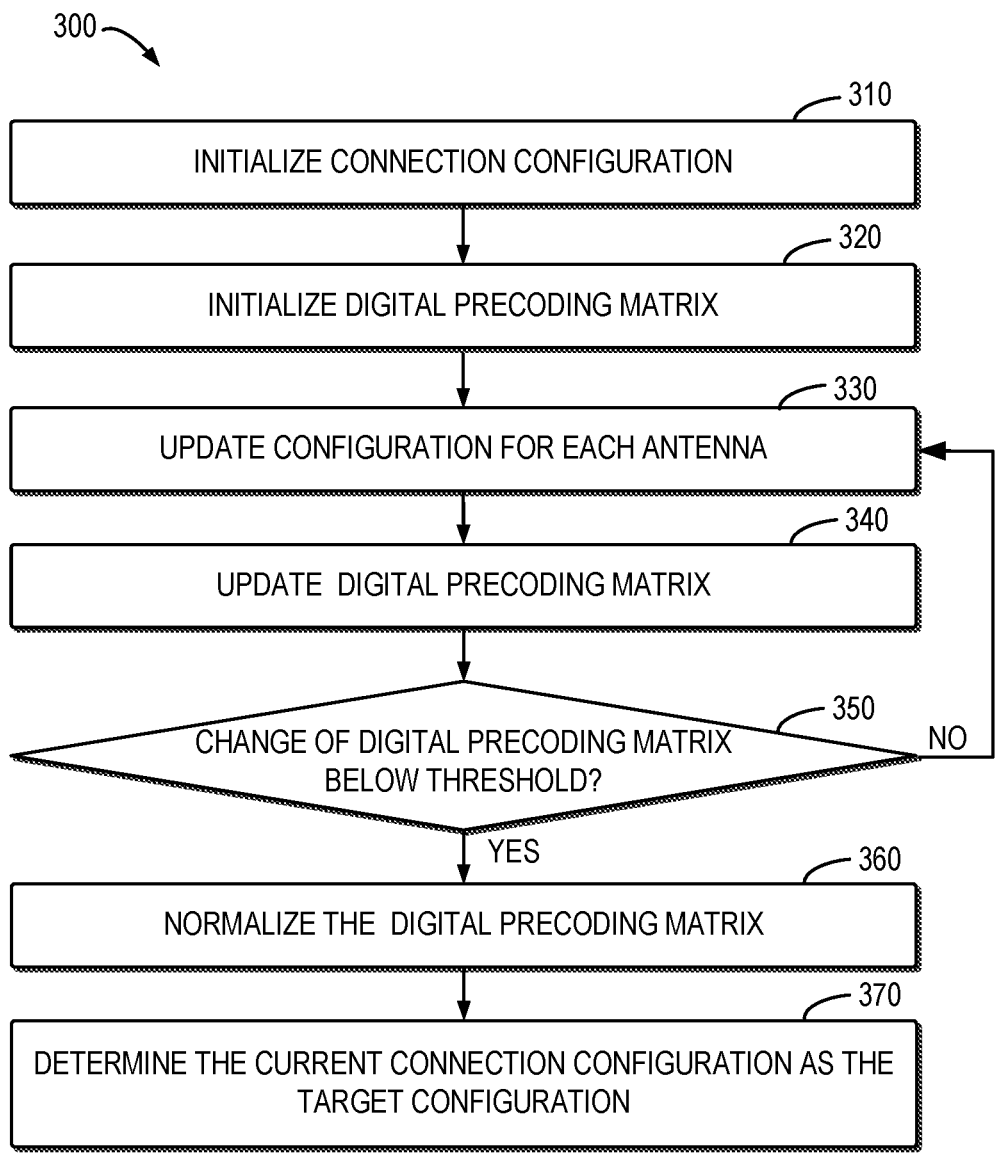
FIG. 3 illustrates a flowchart illustrating an example process for determining a target configuration according to some embodiments of the present disclosure.

Then, the target configuration of the connection between the TDEs 210 and the antenna array is determined based on the time delay information of the TDEs 210 and the channel information. Reference is now made to FIG. 3. FIG. 3 illustrates a flowchart illustrating an example process 300 for determining the target configuration according to some embodiments of the present disclosure. The example process 300 may be implemented by the processing circuit 260 as shown in FIG. 2 for example.

At block 310, the connection configuration between the TDEs 210 and the antenna array 202 is initialized. Specifically, the configuration matrix S is initialized. In some example embodiments, the connection configuration may be initialized by randomly selecting a TDE from the plurality of TDEs 210. For example, for each row $S_i$ in the configuration matrix S, a value of a column is randomly set as 1, and values of other columns are set as 0, where i=1, 2, . . . , $N_t$. In some example embodiments, the connection configuration may be initialized by using a historical configuration of the connection.

At block 320, the digital precoding matrix D[m] is initialized. The digital precoding matrix D[m] is be determined based on the connection configuration and the target precoding information. Specifically, the digital precoding matrix D[m] can be calculated by the following equation (15):

$$D[m] = \hat{V}_{N_s}[m]\hat{U}[m]^H \quad (15)$$

where $\hat{V}_{N_s}[m]$ is the first $N_s$ columns of $\hat{V}[m]$, $\hat{V}[m]$ and $\hat{U}[m]$ are derived from the singular value decomposition of $P[m]^H SF[m]$ according to the equation (16):

$$P[m]^H SF[m] = \hat{U}[m]\hat{\Sigma}[m]\hat{V}[m]^H \quad (16)$$

The digital precoding matrix D[m] is initialized based on the target precoding matrix P[m] and the initialized configuration matrix S. Then, iterative update of the connection configuration and the digital precoding matrix is performed until convergence is reached.

Specifically, at block 330, the configuration is updated for each antenna 220 such that the overall connection configuration is updated. Given that the i-th row $S_i$ in the configuration matrix S corresponds to the i-th antenna in the antenna array 202, each row $S_i$ is updated individually.

To maximize the spectrum efficiency shown in equation (9), the update of each row $S_i$ is converted into a ranking problem as below:

$$S_i(\Sigma_{m=1}^M(-2Re(F[m]D[m]P_i[m]^H) + \text{diag}(F[m]D[m]D[m]^H F[m]^H))) \quad (17)$$

where $P_i[m]$ are the i-th row of P[m]. In other word, $P_i[m]$ represents a portion of the target precoding information corresponding to the i-th antenna in the antenna array 202. This ranking problem can be efficiently solved by any suitable ranking solvers, where the constraint of $S_i$ is that each element is 0 or 1 and there is only one non-zero element in $S_i$.

Each row $S_i$ is updated by solving the ranking problem (17). As such, the connection configuration, i.e., the configuration matrix S is updated. The process 300 proceeds to block 340.

At block 340, the digital precoding matrix D[m] is updated based on the updated connection configuration and the target precoding information. Specifically, the digital precoding matrix D[m] is updated based on the updated configuration matrix S and the target precoding matrix P[m] according to the equations (15) and (16).

At block 350, it is determined whether a change of the digital precoding matrix D[m] is below a threshold. The change of the digital precoding matrix D[m] is determined based on a difference between values of D[m] before the update at block 340 and values of D[m] after the update at block 340.

If the change exceeds the threshold, it means that the convergence is not reached and the process 300 returns to block 330. At block 330, the connection configuration is further updated.

If the change is below the threshold, it means that the convergence is reached and the process 300 proceeds to block 360 and then block 370. At block 360, the digital precoding matrix D[m] is normalized as below:

$$D[m] = \frac{\|P[m]\|_F}{\|SF[m]D[m]\|_F} D[m]. \quad (18)$$

At block 370, the current connection configuration is determined as the target configuration. Accordingly, the configuration matrix S and the digital precoding matrix D[m] are output. In the example embodiments where the switching circuit 203 is implemented as a switch network comprising a plurality of switches, the configuration matrix S is also a representation of on-off states of the plurality of switches.

The above process 300 can be described as a flow of the SRD algorithm, as shown in Table 1.

TABLE 1

Flow of the SRD algorithm
Flow of SRD algorithm

| | |
|---|---|
| Input: | $L_i$, Q, P[m], m = 1, 2, ..., M |
| 01: | Initial S randomly |
| 02: | Initial D[m] as equation (15), m=1, 2, ..., M |
| 03: | Repeat |
| 04: | Parallel for i = 1 : $N_t$ |
| 05: | Update $S_i$ via solving the ranking problem (17) |
| 06: | end for |
| 07: | Update D[m] through equation (15), m=1, 2, ..., M |
| 08: | Until convergence |
| 09: | Normalize each D[m] as $D[m] = \frac{\|P[m]\|_F}{\|SF[m]D[m]\|_F} D[m]$ |
| Output: | S and D[m], m = 1,2, ..., M |

Subsequently, each antenna in the antenna array 202 is connected to a respective TDE 210 based on the target configuration, i.e., the output configuration matrix S. For example, a control command may be generated by the processing circuit 270 and transmitted to the switching circuit 203.

From the above description, in particular the equation (12), the TDEs can adjust the same time delay for all carriers of different frequencies. As a result, the adjusted phases, i.e., the beamforming weights are proportional to the frequencies of the carriers, which can solve the beam squint problem. Moreover, it is to be understood that the process 300 for determining the target configuration is given as an example. Any suitable process can be performed depending on specification forms of the target precoding information, the time delay information and the like.

Figure 4A:
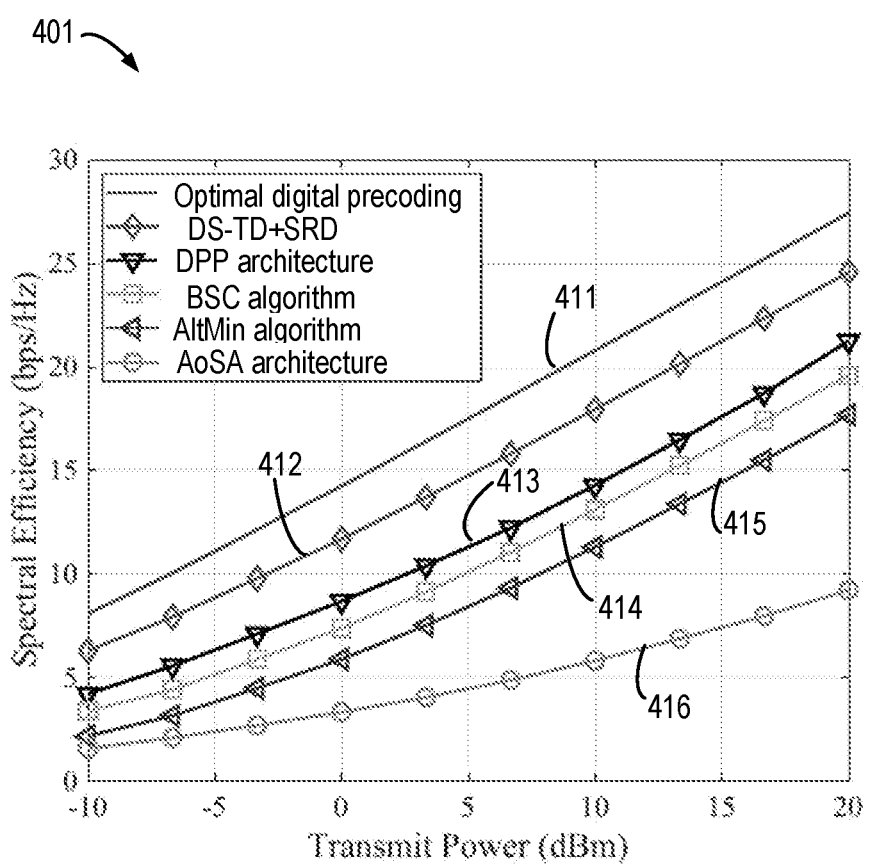
FIG. 4A illustrates a plot of spectral efficiencies achieved by different solutions.
Figure 4B:
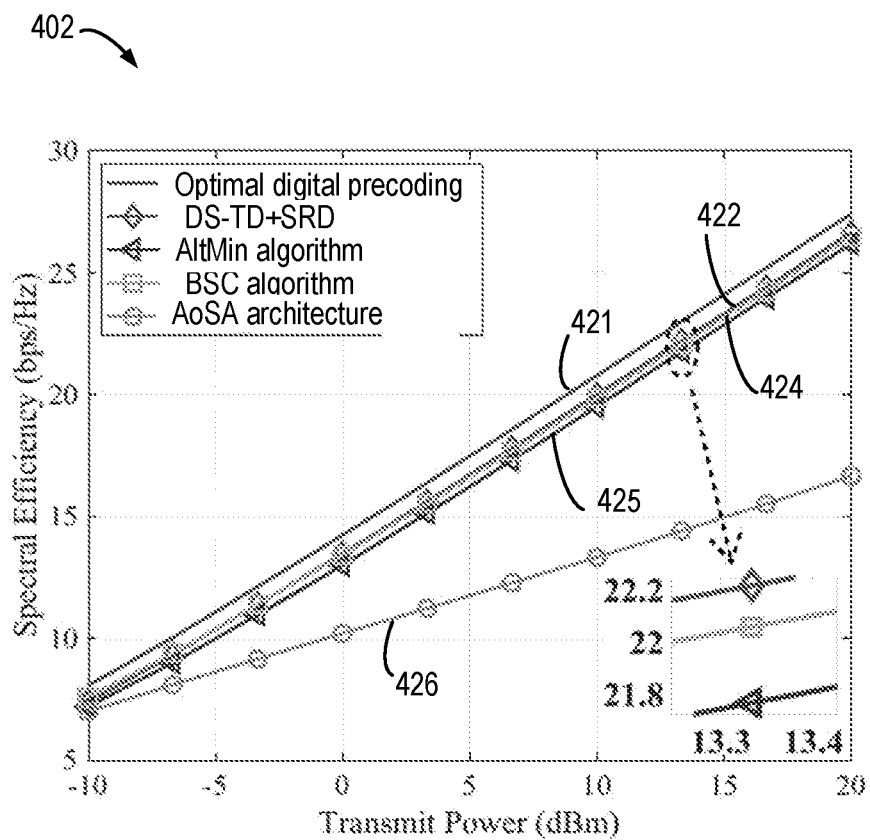
FIG. 4B illustrates another plot of spectral efficiencies achieved by different solutions.
Figure 4C:
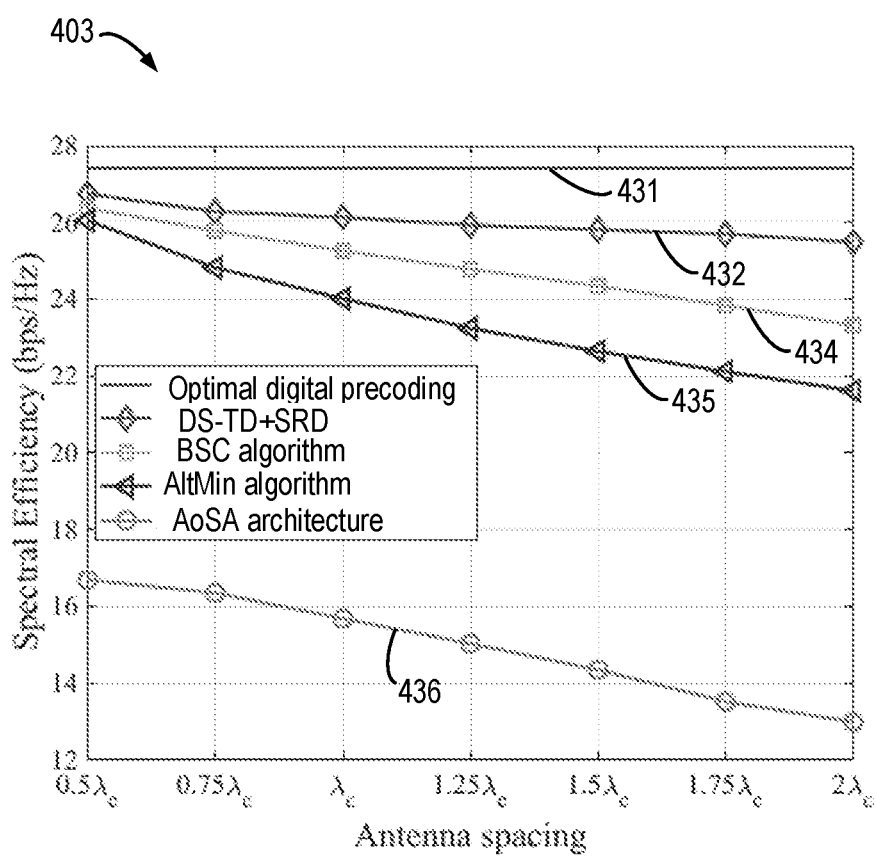
FIG. 4C illustrates a further plot of spectral efficiencies achieved by different solutions.

Reference is now made to FIGS. 4A, 4B and 4C. FIG. 4A illustrates a plot 401 of spectral efficiencies achieved by different solutions. The spectral efficiencies as shown in FIG. 4A are achieved under the following scenarios: a THz UM-MIMO system with ULA; the carrier central frequency is 300 GHz; the bandwidth is 30 GHz; a communication distance is 60 m; the number of antennas is 1024; and the antenna spacing is half of wavelength. The curve 411 corresponds to the optimal digital precoding; the curve 412 corresponds to the DS-TD architecture with the SRD algorithm of the present disclosure; the curve 413 corresponds to the DPP architecture; the curve 414 corresponds to the BSC algorithm; the curve 415 corresponds to the AltMin algorithm; and the curve 416 corresponds to the AoSA algorithm.

As shown in FIG. 4A, the DS-TD architecture with the SRD algorithm of the present disclosure can approach the optimal digital precoding with a 2.5 bps/Hz spectral efficiency gap when $\rho=20$ dBm. Compared to the DPP architecture, the BSC algorithm and the AltMin algorithm, the DS-TD architecture with the SRD algorithm of the present disclosure can achieve 4.8 bps/Hz, 5.8 bps/Hz, and 7.7 bps/Hz higher spectral efficiency when $\rho=20$ dBm.

FIG. 4B illustrates a plot 402 of spectral efficiencies achieved by different solutions in a UPA. The spectral efficiencies as shown in FIG. 4B are achieved under the following scenarios: a THz UM-MIMO system with the UPA; the carrier central frequency is 300 GHz; the bandwidth is 30 GHz; a communication distance is 60 m; the number of antennas is 1024; and the antenna spacing is half of wavelength. The curve 421 corresponds to the optimal digital precoding; the curve 422 corresponds to the DS-TD architecture with the SRD algorithm of the present disclosure; the curve 424 corresponds to the BSC algorithm; the curve 425 corresponds to the AltMin algorithm; and the curve 426 corresponds to the AoSA algorithm.

The beam squint problem in the UPA is insignificant due to the following reasons. By arranging the antennas in a planar form, the physical size of the UPA is much smaller than the ULA. As a result, the beam width of the UPA is wider than the ULA such that the UPA is insensitive to the beam squint. As shown in FIG. 4B, the spectral efficiencies of the DS-TD architecture with the SRD algorithm of the present disclosure, the BSC algorithm and the AltMin algorithm are similar and approach that of the optimal digital precoding.

FIG. 4B illustrates a plot 402 of spectral efficiencies in the UPA versus the antenna spacing. The spectral efficiencies as shown in FIG. 4C are achieved under the following scenarios: a THz UM-MIMO system with the UPA; the carrier central frequency is 300 GHz; the bandwidth is 30 GHz; a communication distance is 60 m; the number of antennas is 1024; and the transmit power is 20 dBm. The curve 431 corresponds to the optimal digital precoding; the curve 432 corresponds to the DS-TD architecture with the SRD algorithm of the present disclosure; the curve 434 corresponds to the BSC algorithm; the curve 435 corresponds to the AltMin algorithm; and the curve 436 corresponds to the AoSA algorithm.

With wider antenna spacing, the physical size of the UPA is larger, which results in a narrower beam. As a result, the system is more sensitive to beam misalignment and the beam squint problem is more severe. The advantage of the DS-TD architecture with the SRD algorithm of the present disclosure on spectral efficiency grows with the antenna spacing.

Example Method and Apparatus

Figure 5:
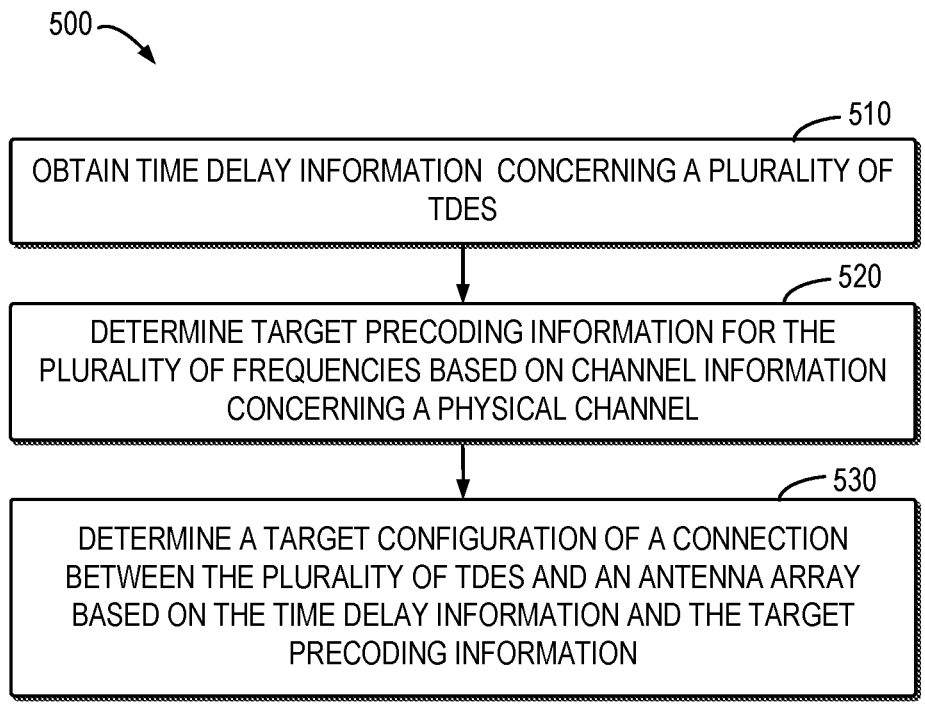
FIG. 5 illustrates a flowchart of an example method according to some embodiments of the present disclosure.

FIG. 5 shows a flowchart of an example method 500 according to some example embodiments of the present disclosure. The method 500 can be implemented at a device e.g. at the network device 110 or terminal device 120 as shown in FIG. 1. For example, the method 500 may be implemented by the processing circuit 270. For the purpose of discussion, the method 500 will be described with reference to FIG. 2.

At block 510, the processing circuit 270 obtains time delay information concerning a plurality of TDEs 210. A TDE of the plurality of TDEs 210 is configured to apply a same time delay at a plurality of frequencies. For example, the processing circuit 270 may obtain the TD matrix F[m] as shown in the equation (11).

At block 520, the processing circuit 270 determines target precoding information for the plurality of frequencies based on channel information concerning a physical channel. Signals at the plurality of frequencies are to be transmitted over the physical channel. For example, the target precoding matrix P[m] may be derived by the singular value decomposition of the channel matrix H[m] according to the equations (13) and (14).

At block 530, the processing circuit 270 determines a target configuration of a connection between the plurality of TDEs 210 and an antenna array 202 based on the time delay information and the target precoding information. The target configuration indicates a TDE to which an antenna in the antenna array 202 is to be connected. For example, the configuration matrix S may be determined based on the TD matrix F[m] and the target precoding matrix P[m].

In some example embodiments, the processing circuit 270 determines a digital precoding matrix D[m] for the plurality of frequencies based on the target precoding information, the time delay information and a first configuration of the connection. For example, acts of block 340 for a turn of iteration are performed. The processing circuit 270 determines a second configuration of the connection based on the digital precoding matrix D[m], the target precoding information, and the time delay information. For example, acts of block 330 for a next turn of the iteration are performed. The processing circuit 270 updates the digital precoding matrix D[m] based on the second configuration, the target precoding information and the time delay information. For example, acts of block 340 for the same turn of the iteration are performed. If a difference between the updated digital precoding matrix and the digital precoding matrix is below a threshold, the second configuration is determined as the target configuration. For example, acts of block 350 are performed. Therefore, the first configuration may refer to the configuration initialized at block 310 or a configuration updated at block 330 during iteration.

In some example embodiments, the first configuration may be the configuration initialized at block 310. The processing circuit 270 may generate the first configuration of the connection by randomly selecting a TDE from the plurality of TDEs 210 for each antenna in the antenna array 202.

In some example embodiments, to determine the second configuration, the processing circuit 270 may determine, for a given antenna in the antenna array 202, a target function based on the time delay information, the digital precoding matrix, and a portion of the target precoding information corresponding to the given antenna. The processing circuit 270 may determine, from the plurality of TDEs, a target TDE for the given antenna by minimizing the target function. For example, the processing circuit 270 may update the configuration matrix by solving the ranking problem (17).

In some example embodiments, the processing circuit 270 further causes a switching circuit 203 to connect the antenna in the antenna array 202 to the indicated TDE. For example, the processing circuit 270 may generate a command based on the target configuration and transmit the command to the switching circuit 203.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus comprises: means for obtaining time delay information concerning a plurality of time delay elements, a time delay element of the plurality of time delay elements configured to apply a same time delay at a plurality of frequencies; means for determining target precoding information for the plurality of frequencies based on channel information concerning a physical channel, signals at the plurality of frequencies are to be transmitted over the physical channel; means for determining a target configuration of a connection between the plurality of time delay elements and an antenna array based on the time delay information and the target precoding information, the target configuration indicating a time delay element to which an antenna in the antenna array is to be connected.

In some example embodiments, the means for determining the target configuration comprises: means for determining a digital precoding matrix for the plurality of frequencies based on the target precoding information, the time delay information and a first configuration of the connection; means for determining a second configuration of the connection based on the digital precoding matrix, the target precoding information, and the time delay information; means for updating the digital precoding matrix based on the second configuration, the target precoding information and the time delay information; and means for in accordance with a determination that a difference between the updated digital precoding matrix and the digital precoding matrix is below a threshold, determining the second configuration as the target configuration.

In some example embodiments, the means for determining the second configuration comprises: means for determining, for a given antenna in the antenna array, a target function based on the time delay information, the digital precoding matrix, and a portion of the target precoding information corresponding to the given antenna; and means for determining, from the plurality of time delay elements, a target time delay element for the given antenna by minimizing the target function.

In some example embodiments, the apparatus further comprises: means for generating the first configuration of the connection by randomly selecting a time delay element from the plurality of time delay elements for each antenna in the antenna array.

In some example embodiments, the apparatus further comprises: means for causing a switching circuit to connect the antenna in the antenna array to the indicated time delay element.

Figure 6:
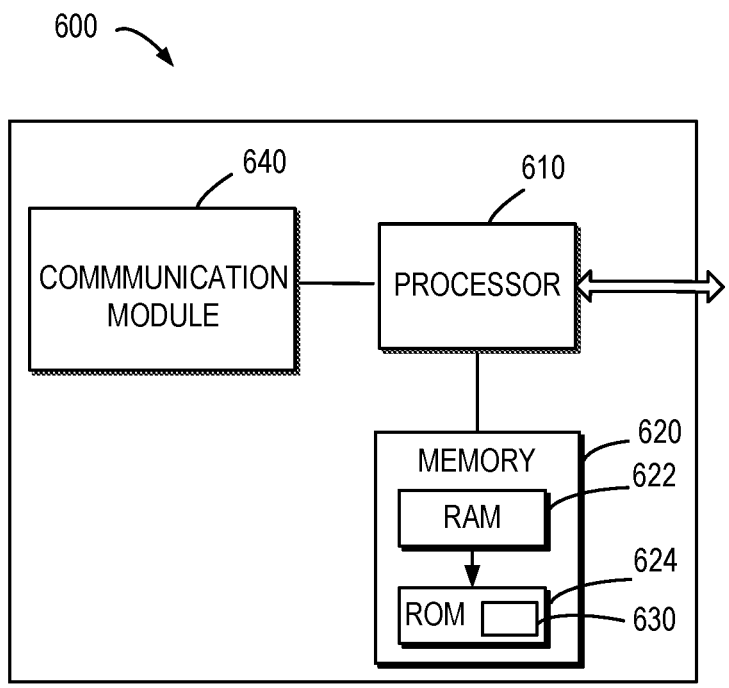
FIG. 6 illustrates a simplified block diagram of a device that is suitable for implementing embodiments of the present disclosure.

FIG. 6 is a simplified block diagram of a device 600 that is suitable for implementing embodiments of the present disclosure. The device 600 may be provided to implement the communication device, for example the terminal devices 120 or the network device 110 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 3 and 5. The embodiments of the present disclosure may also be implemented by hardware or by a combination of software and hardware.

Figure 7:
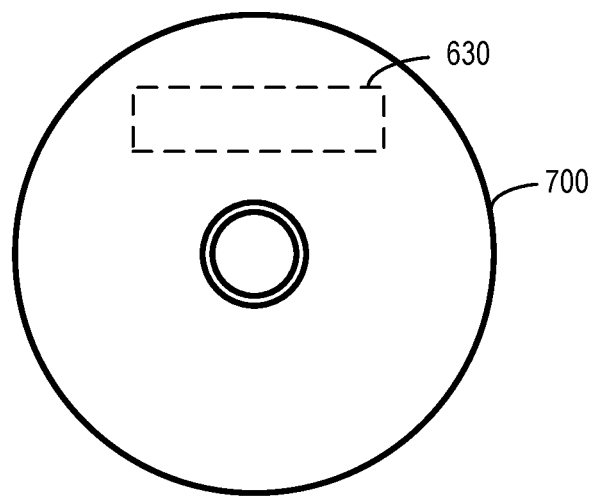
FIG. 7 illustrates a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process 300 or the method 500 as described above with reference to FIGS. 3 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory including computer program codes;
   the at least one memory and the computer program codes are configured to, with the at least one processor, cause the apparatus to:
      obtain time delay information concerning a plurality of time delay elements, a time delay element of the plurality of time delay elements configured to apply a same time delay at a plurality of frequencies;
      determine target precoding information for the plurality of frequencies based on channel information concerning a physical channel, signals at the plurality of frequencies are to be transmitted over the physical channel;
      determine a target configuration of a connection between the plurality of time delay elements and an antenna array based on the time delay information and the target precoding information, the target configuration indicating a time delay element to which an antenna in the antenna array is to be connected.

2. The apparatus of claim 1, wherein the apparatus caused to determine the target configuration comprises the apparatus caused to:
   determine a digital precoding matrix for the plurality of frequencies based on the target precoding information, the time delay information and a first configuration of the connection;
   determine a second configuration of the connection based on the digital precoding matrix, the target precoding information, and the time delay information;
   update the digital precoding matrix based on the second configuration, the target precoding information and the time delay information; and
   in accordance with a determination that a difference between the updated digital precoding matrix and the digital precoding matrix is below a threshold, determine the second configuration as the target configuration.

3. The apparatus of claim 2, wherein the apparatus caused to determine the second configuration comprises the apparatus caused to:
   determine, for a given antenna in the antenna array, a target function based on the time delay information, the digital precoding matrix, and a portion of the target precoding information corresponding to the given antenna; and
   determine, from the plurality of time delay elements, a target time delay element for the given antenna by minimizing the target function.

4. The apparatus of claim 2, wherein the apparatus is further caused to:
   generate the first configuration of the connection by randomly selecting a time delay element from the plurality of time delay elements for each antenna in the antenna array.

5. The apparatus of claim 1, wherein the apparatus is further caused to:
   cause a switching circuit to connect the antenna in the antenna array to the indicated time delay element.

6. A device comprising:
   a plurality of time delay elements coupled to at least one radio frequency chain, a time delay element of the plurality of time delay elements being configured to apply a same time delay to signals at a plurality of frequencies received from the at least one radio frequency chain; and an antenna array, an antenna in the antenna array being configured to be selectively connected to a time delay element of the plurality of time delay elements based on a target configuration of a connection between the plurality of time delay elements and the antenna array.

7. The device of claim 6, wherein the plurality of time delay elements comprises a plurality groups of time delay elements and each group of the plurality group of time delay elements is coupled one of the at least one radio frequency chain.

8. The device of claim 7, wherein each group of the plurality groups of time delay elements has the same number of time delay elements.

9. The device of claim 7, wherein time delays applied by time delay elements in the same group of time delay elements are different from each other.

10. The device of claim 6, further comprising:
a switching circuit coupled between the plurality of time delay elements and the antenna array and configured to connect the antenna in the antenna array to the time delay element based on the target configuration.

11. The device of claim 6, wherein the time delay applied by the time delay element of the plurality of time delay elements is fixed during operation of the device.

12. The device of claim 6, wherein the device comprises a network device.

13. A method comprising:
obtaining time delay information concerning a plurality of time delay elements, a time delay element of the plurality of time delay elements configured to apply a same time delay at a plurality of frequencies;

determining target precoding information for the plurality of frequencies based on channel information concerning a physical channel, signals at the plurality of frequencies are to be transmitted over the physical channel;

determining a target configuration of a connection between the plurality of time delay elements and an antenna array based on the time delay information and the target precoding information, the target configuration indicating a time delay element to which an antenna in the antenna array is to be connected.

14. The method of claim 13, wherein determining the target configuration comprises:
determining a digital precoding matrix for the plurality of frequencies based on the target precoding information, the time delay information and a first configuration of the connection;

determining a second configuration of the connection based on the digital precoding matrix, the target precoding information, and the time delay information;

updating the digital precoding matrix based on the second configuration, the target precoding information and the time delay information; and in accordance with a determination that a difference between the updated digital precoding matrix and the digital precoding matrix is below a threshold, determining the second configuration as the target configuration.

15. The method of claim 14, wherein determining the second configuration comprises:
determining, for a given antenna in the antenna array, a target function based on the time delay information, the digital precoding matrix, and a portion of the target precoding information corresponding to the given antenna; and determining, from the plurality of time delay elements, a target time delay element for the given antenna by minimizing the target function.

16. The method of claim 14, further comprising:
generating the first configuration of the connection by randomly selecting a time delay element from the plurality of time delay elements for each antenna in the antenna array.

17. The method of claim 13, further comprising:
causing a switching circuit to connect the antenna in the antenna array to the indicated time delay element.

* * * * *